United States Patent [19]

Hemmady et al.

[11] Patent Number: 5,398,236
[45] Date of Patent: Mar. 14, 1995

[54] ASYNCHRONOUS TRANSFER MODE LINK RECOVERY MECHANISM

[75] Inventors: Ajit G. Hemmady, Plano; Carl F. Reisig, Carrollton, both of Tex.

[73] Assignee: NEC America, Inc., Melville, N.Y.

[21] Appl. No.: 67,690

[22] Filed: May 26, 1993

[51] Int. Cl.⁶ .................. H04J 3/14; H04B 17/00; H04L 1/22
[52] U.S. Cl. ........................ 370/16; 370/60; 370/94.1; 370/13
[58] Field of Search ............ 370/13, 16, 60, 60.1, 370/94.1, 85.9; 379/221, 273; 371/7, 8.2; 340/827

[56] References Cited

U.S. PATENT DOCUMENTS

| | | | |
|---|---|---|---|
| 4,550,397 | 10/1985 | Turner et al. | 370/94.1 |
| 4,679,189 | 7/1987 | Olson et al. | 370/60 |
| 4,884,263 | 11/1989 | Suzuki | 370/60 |
| 4,903,233 | 2/1990 | Cain et al. | 370/94.1 |
| 5,058,105 | 10/1991 | Mansour et al. | 370/16 |
| 5,130,984 | 7/1992 | Cisneros | 370/60 |
| 5,239,537 | 8/1993 | Sakauchi | 370/16 |
| 5,241,534 | 8/1993 | Omuro et al. | 370/16 |

Primary Examiner—Douglas W. Olms
Assistant Examiner—Huy D. Vu
Attorney, Agent, or Firm—Lane, Aitken & McCann

[57] ABSTRACT

An inter-node communications link failure recovery system for ATM nodes in which connections are quickly switched from a faulty link to one or more existing links. Within a node, alternate connection routes are predetermined for every connection originating at or terminating to a circuit connected to a link of interest (i.e., a link where recovery from a link fault is desired). The routing information for alternate connections is stored in the ATM node CPU memory. In response to an alarm indicating a break or other failure of link, the Network Management System sends a command to the node to establish hardware "loopback" path in the node interface circuit connected to the faulty link. The ATM node 10 then down-loads the alternate routing information for the failed link to the node routing tables used to route a cell onto a link in accordance with the cell header data. This causes all cells originally set up for transmission over the faulty link to be rerouted to a predetermined alternate link.

5 Claims, 2 Drawing Sheets

ASYNCHRONOUS TRANSFER MODE LINK RECOVERY MECHANISM

BACKGROUND OF THE INVENTION

1. Field of the Invention

This invention relates to Asynchronous Transfer Mode packet switching, and more particularly to an improved recovery system to reroute data in the event of a link failure.

2. Description of the Prior Art

As will be appreciated by those skilled in the art, telecommunication networks around the world are implementing systems based on standards established and known in the art as the Broadband Integrated Services Digital Network (B-ISDN). Within an B-ISDN system, data is transferred in a high-speed network from source to destination through a series of interconnected nodes. Within the B-ISDN specification a specifically defined packet orientated transfer mode is commonly used, called "Asynchronous Transfer Mode (ATM)". This is an asynchronous multiplexing operation, with the multiplexed information flow organized in fixed size blocks, called cells. Current trends in standardization of the ATM transport format favor a cell size that has a 48-byte information field and a 5-byte header.

Prior to launching a cell, a virtual path is established and dedicated for the cell transmission through the various nodes in the system. The cell header includes the source and routing information and each node has a routing table that, based upon the routing information, routes the cell between an input link upon which the cell arrived and a proper output link in accordance with the cell header and routing information.

Nodes in an ATM system are commonly interconnected by high-speed communication links, such as a full duplex telephone T3 link with a DS3 specified format. Several other communication links such as $T_1$, OC3, OC12 and the like can be used. The invention is not limited to a specific link. If a communication link between nodes is broken or faulty, an alternate route for cells assigned to the broken or faulty link must be immediately established. There have been a number of prior art proposals for re-routing cells in the presence of a faulty or broken communication link between switching nodes. One that is attractive, in terms of recovery speed, provides dedicated spare communication links and spare circuits within the node, which are used in the event of a communication link failure between nodes. This approach, while satisfactory in terms of result, is costly in that it requires spare equipment and communication links. In addition, such prior art systems are complex in terms of system administration.

SUMMARY OF THE INVENTION

An object of this invention is the provision of an inter-node communications link failure recovery system for ATM nodes that provides fast recovery without requiring dedicated spare links and circuits.

Another object of this invention is the provision of an inter-node communications link failure recovery system that is relatively simple in terms of system administration.

Briefly, this invention contemplates the provision of an inter-node communications link failure recovery system for ATM nodes in which connections are quickly switched from a faulty link to one or more existing links. Within a node, alternate connection routes are predetermined for every connection origination at or terminating to a circuit connected to a link of interest (i.e., a link where recovery from a link fault is desired). The routing information for alternate connections is stored in the ATM Node CPU memory. In response to an alarm indicating a break or other failure of link, the Network Management System sends a command to the ATM node to establish a hardware "loopback" path in the node interface circuit connected to the faulty link. This causes all cells originally set up for transmission over the faulty link to be re-routed to a predetermined alternate link. Several thousand connections can be re-routed in a matter of a few seconds.

The original routing information for the faulty link is copied and stored in the ATM Node CPU memory so that when the faulty link is restored to an operational condition, the Network Management System issues a command that deletes the hardware loopback and restores the original routing table data for connections on the faulty link, which has now become operational.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
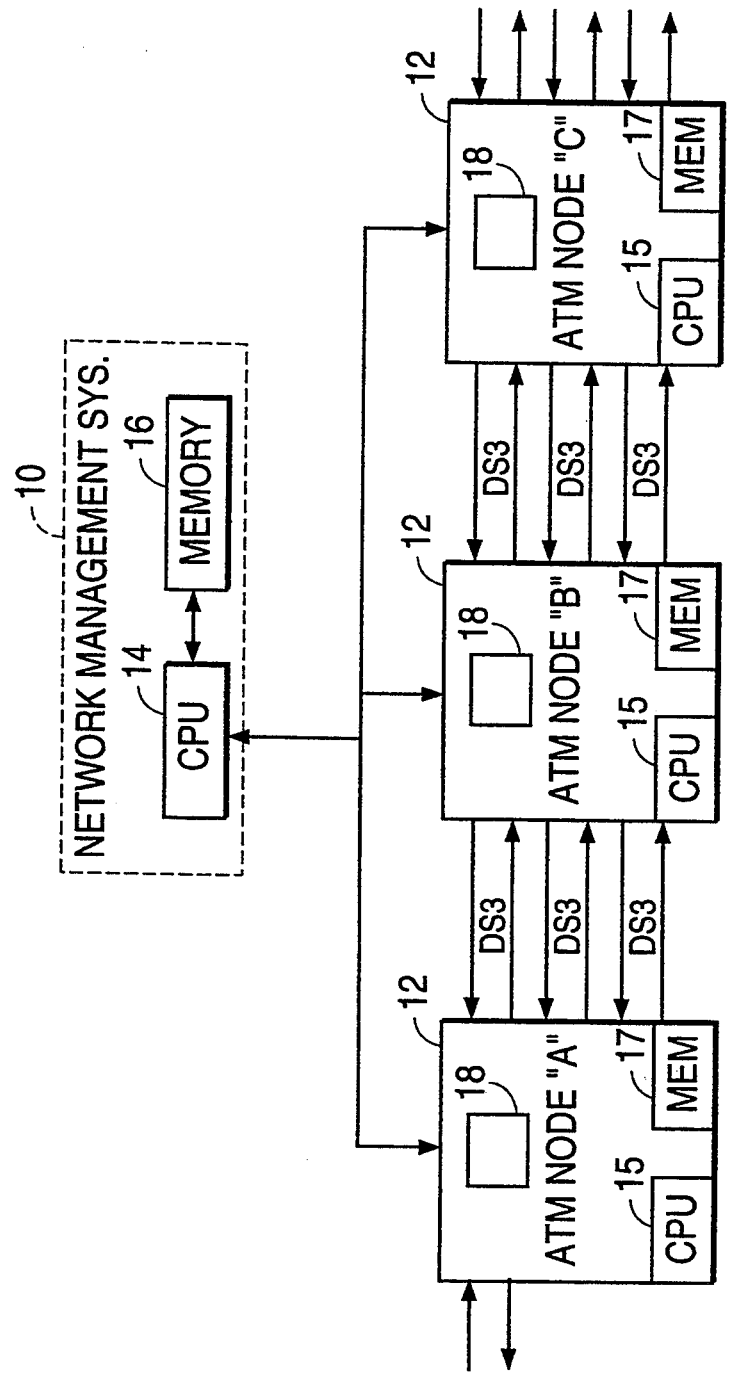
FIG. 1 is a simplified block diagram of a typical ATM system.

Referring now to FIG. 1 of the drawings, as will be appreciated by those skilled in the art, a typical ATM system includes a Network Management System (NMS) 10 and a plurality of interconnected ATM nodes 12 labeled in the drawing as nodes A, B, and C. Each node 12 inclues a CPU 15 and a memory 17. In this exemplary network, the nodes 12 are interconnected by full duplex T3 links as common in the industry. The Network Management System 10, which includes a CPU 14, controls the overall operation of the system via suitable program commands to the nodes 12. In addition, the CPU can up-load and down-load data from a memory 16 to a node memory 17. A fault detector 18 at each node detects a fault in a T3 link between nodes, and generates an alarm signal that is transferred to the Network Management System 10. Cells (typically comprised of a 48-byte information field and a 5-byte header) are routed by the switching nodes 12 from incoming to outgoing T3 links, in accordance with routing information contained in the cell header. Systems of the type outlined here are well known to those skilled in the art, and are set forth in more detail in various standards and publications, including a special issues dedicated B-ISDN published in the February 1991 issue of *The Proceedings of the IEEE*, which is incorporated herein by reference.

Figure 2:
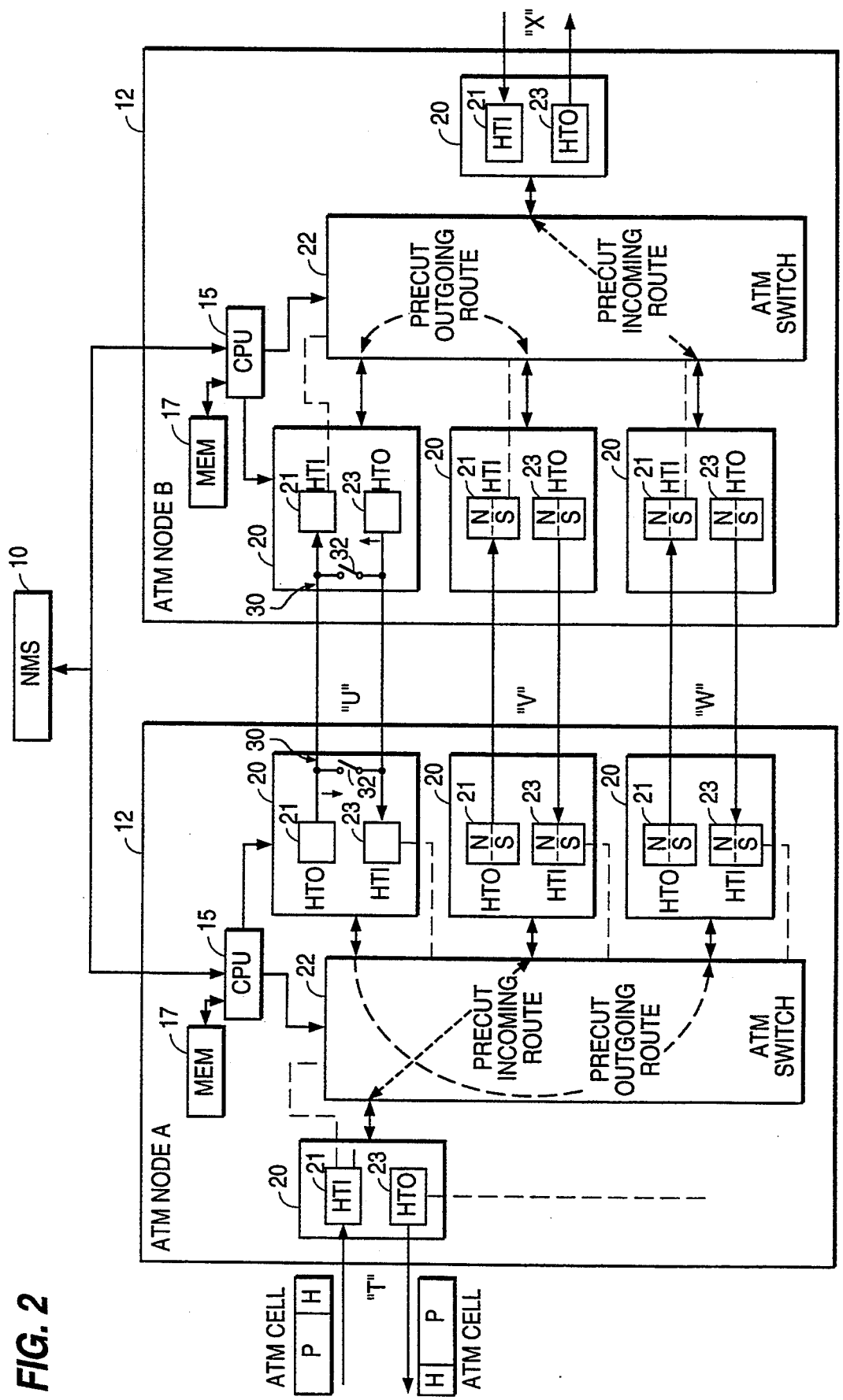
FIG. 2 is a simplified block diagram of two ATM nodes in accordance with the teachings of this invention.

Referring now to FIG. 2 of the drawings, it shows interconnected ATMs A and B at a level of detail useful in describing the inventive link fault recovery system, which involves both software modifications to a conventional ATM and a hardware modification to the conventional ATM. Each ATM node (i.e., node A and B) is comprised essentially of the same functional components. These include a number of ATM interface cards 20, which interface the respective T3 links (labeled here T, U, V, W and X) to the ATMs. In the upper left-hand portion of FIG. 2, there a cell is represented pictorially, comprised of a header portion H and a data field or payload P.

Each interface card 20 has an incoming header translator table 21 (HTI) and an outgoing header translator table 23 (HTO). It should be noted that in this exemplary embodiment of the invention, the translation tables that interface to T3 links V and W have two sets of routing entries; so-called normal routing entries N that are used in the absence of a link fault, and so-called spare routing entries S that are used in the event the emergency re-routing procedure of the invention is envoked. It will be appreciated that the links V and W are not spare links dedicated to fault recovery re-routing (although one or more links could be dedicated within the teachings of the invention), but are assumed to have sufficient spare capacity to handle the increased traffic as a result of a failure. Further, it will be appreciated that each interface card in the ATM can have spare, as well as normal, routing table entries, if desired, while in some applications only a single link with spare routing entries may be sufficient for emergency recovery.

An ATM switch 22 serves to route incoming cells to an outgoing link in accordance with the routing information contained in the cell header H. The incoming header translator table HTI translates the header data to switch routing data, causing the switch 22 to route the cells through a virtual path in accordance with the cell header. As will be appreciated by those skilled in the art, in the normal operation of the ATM, the outgoing header translator table HTO modifies the cell header data in transmitting the cell over a T3 link.

The interface cards at each end of the link of interest (here, link "U") has a loopback path 30, which is controlled by commands from the NMS 10, as illustrated schematically by the switch 32. The loopback path 30 is from the output of outgoing header translator table 21 to the input of its incoming header translator table 23. The loopback path is established when the fault recovery procedure of the invention is in effect and is disestablished in normal (i.e., non-recovery) operating modes. While a loopback path has been illustrated in the drawing on only the interface cards associated with the T3 link "U" it will be appreciated that each interface card terminating a link from which it is desired to be able to implement the recovery procedure of this invention, will have a controlled loopback path.

As will be appreciated by those skilled in the art, in normal operation (i.e., the absence of a link fault) an incoming cell to node A on link "T" will be routed by ATM switch 22 in accordance with the cell header data and the incoming header translator table HTI on the interface card 20 connected to link "T". For example, it will be routed to link "U" for transmission to node B.

In accordance with this invention, "precut" routes are determined to re-route cells from a failed link to a predetermined link, or links with spare capacity. In this illustrative embodiment of the invention, the system has been programmed with precut connections re-routing link "U" in the event of a failure, to links "T" and "V". It will be appreciated that a link can be routed to a single alternate link, or to more than two alternate links.

To the end of establishing precut connection routes for link "U" to links "V" and "W" a portion S of the incoming header translator table 23 (HTI) for links "V" and "W" in node A and in node B, are coded to respond to cell header data for cells that have been re-routed from link "U". In addition, a precut header translator table is programmed for link "U" to re-route cells from link "U". This precut header translator table is stored in the memory 17 of the ATM nodes A and B and down-loaded to the link "U" incoming header translator tables 23 in nodes A and B in the event of a failure of link "U", replacing the normal link "U" incoming header translator tables. The normal link "U" incoming header translator tables are saved in the CPU memories 17. These "normal" tables can be used to restore the original connection when link "U" becomes operational again.

When the Network Management System 10 receives an alarm message, for example, from detector 18, indicating link "U" between nodes A and B has failed, it sends a loopback command to both nodes. This results in the following actions in node A and node B. The then current incoming header translator tables 23 for link "U" in nodes A and B are copied into memory 17 and are zeroed out in the tables themselves. The loopback paths 30 are established between the outgoing and incoming ports connected to link "U" in both nodes A and B and the precut incoming header translator table for link "U" is down-loaded from ATM node CPU memory 17 and copied into the incoming header translator tables 23. This results in outgoing cells on link "U" being re-routed by the ATM switches 22 to links "V" and "W" in accordance with the precut incoming header translator tables that have been installed as part of the recovery procedure. These re-routed connections are indicated by the dashed links in FIG. 2.

A link can be restored after having failed in one of two alternative procedures.

The Network Management System 10 can transfer outgoing connections from the failed link one connection at a time for node A and similarly for node B. Since the incoming traffic has already been transferred as a result of the emergency recovery action, when the last outgoing connection to link "U" is transferred, the interface card on link "U" would not be carrying any traffic. When link "U" is fixed and tested, the connections can be transferred back (one connection at a time) to link "U", after removing the loopback between the outgoing and the incoming translator header tables of the link interface card.

Alternatively, when Network Management System 10 gets a message indicating that link "U" has been fixed and tested, it sends a delete loopback command to node A and B. The precut incoming header translator tables are zeroed out in incoming header translator table 23. The hardware (via firmware) is commanded to remove the loopback connection in the link interface cards of link "U". The "normal" tables are down-loaded from ATM node 12' CPU memory 17.

If both alternatives are provided, unique delete loopback commands, are required to tell the ATM node which of the two restoration options is being applied. On a given restoration phase either one or the other can be used, not both simultaneously. Furthermore, if the first option is used, the ATM node would clear the precut and the normal incoming header translator table in its CPU memory when the delete loopback command is received, since they do not have the same meaning and application as in the second option. As such, the precut connections for future failure condition of link "U" have to be re-established by NMS.

Note that establish precut and delete precut connection commands will be allowed once a loopback has been established on the link. Also, the normal establish connection, delete connection commands are also allowed on an ATM T3 link which has a cable cut. This will provide added flexibility to the ATM node 12, in the sense that it will allow the normal capacity of an ATM interface card to be used even after a cable cut has occurred.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In an ATM system in which an incoming data cell on a first communications link is routed to a second communications link as an outbound data cell in accordance with an incoming header in said incoming data cell on said first communications link and a first normal incoming header translation table stored at an ATM node in order to interface said first communications link to said ATM node, a method for re-routing data cells routed to an outbound port of said second communications link to an alternate communications link when a fault occurs in said second communications link, comprising the steps of:
   prior to the existence of a fault condition in said second communications link:
   a. forming a precut incoming header translation table for interfacing an incoming data cell on said second communications link to said ATM node when there is a fault condition in said second communications link;
   b. storing in a memory said precut incoming header translation table;
   in response to a fault condition in said second communications links;
   a. substituting said precut incoming header translation table for a second normal incoming header translation table stored at said ATM node in order to interface said ATM node to said second communications link; and
   b. establishing a loop-back path between said outbound port and an inbound port of said second communications link to couple an outbound data cell routed to said outbound port of said second communications link back to said inbound port of said second communications link, whereby said ATM node re-routes said outbound data cell in accordance with said precut incoming header translation table in response to a fault condition in said second communications link.

2. A method for re-routing ATM cells as in claim 1, including the further steps of;
   storing said second normal incoming header translation table in a memory in response to a fault condition;
   substituting said second normal incoming header translation for said precut incoming header translation table when said second communications link is restored to service; and
   dis-establishing said loop-back path.

3. A method for re-routing ATM cells as in claim 1, wherein said alternate communications link has an incoming header translation table with spare routing entries and including the further step of routing cells re-routed from said second communications link in accordance with said spare routing entries.

4. A method for re-routing ATM cells as in claim 2, wherein said second normal incoming header translation table is saved in an ATM switch CPU memory.

5. A method for re-routing ATM cells as in claim 3, including the further steps of;
   storing said second normal incoming header translation table in a memory in response to a fault condition;
   substituting said second normal incoming header translation table for said precut incoming header translation table when said second communications link is restored to service; and
   dis-establishing said loop-back path.

* * * * *